US009553458B2

United States Patent
Tanabe (10) Patent No.: US 9,553,458 B2
(45) Date of Patent: Jan. 24, 2017

(54) POWER SUPPLY APPARATUS, CONTROL METHOD, AND RECORDING MEDIUM

(71) Applicant: CANON KABUSHIKI KAISHA, Tokyo (JP)

(72) Inventor: Akihiro Tanabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 629 days.

(21) Appl. No.: 13/922,110

(22) Filed: Jun. 19, 2013

(65) Prior Publication Data
US 2013/0342160 A1 Dec. 26, 2013

(30) Foreign Application Priority Data
Jun. 25, 2012 (JP) .................................. 2012-142178

(51) Int. Cl.
*H02J 5/00* (2016.01)
*H04B 5/00* (2006.01)
*H02J 7/02* (2016.01)
*H02J 7/00* (2006.01)

(52) U.S. Cl.
CPC ............. *H02J 5/005* (2013.01); *H04B 5/0031* (2013.01); *H04B 5/0037* (2013.01); *H04B 5/0075* (2013.01); *H02J 7/0004* (2013.01); *H02J 7/025* (2013.01)

(58) Field of Classification Search
CPC ....................................................... H02J 5/005
USPC .......................................................... 320/108
See application file for complete search history.

(56) References Cited

U.S. PATENT DOCUMENTS

| 2006/0184705 | A1* | 8/2006 | Nakajima | ............. | H02J 7/0004 |
| | | | | | 710/303 |
| 2010/0306561 | A1* | 12/2010 | Sathath | ................... | G06F 1/266 |
| | | | | | 713/320 |
| 2011/0115923 | A1* | 5/2011 | Moritomo | ............... | G06F 21/31 |
| | | | | | 348/207.1 |
| 2011/0136550 | A1* | 6/2011 | Maugars | ................. | H02J 7/025 |
| | | | | | 455/573 |
| 2012/0108181 | A1* | 5/2012 | Matsuo | ............... | H04W 76/028 |
| | | | | | 455/68 |
| 2012/0295672 | A1* | 11/2012 | Kim | .................... | H04M 1/2745 |
| | | | | | 455/573 |

(Continued)

FOREIGN PATENT DOCUMENTS

JP 2003-032261 A 1/2003
JP 2008-295191 A 12/2008

(Continued)

*Primary Examiner* — Edward Tso
*Assistant Examiner* — Jerry D Robbins
(74) *Attorney, Agent, or Firm* — Canon U.S.A., Inc. IP Division (57) ABSTRACT

A power supply apparatus includes a power supply unit that wirelessly supply power to an electronic device, a first communication unit that communicates, based on a first communication method, with the electronic device, a second communication unit that communicates, based on a second communication method that is different from the first communication method, with the electronic device, and a control unit that controls the first communication unit so as to acquire authentication data for a communication between the second communication unit and the electronic device if a remaining capacity of a battery, connected to the electronic device, is equal to or more than a predetermined value.

13 Claims, 5 Drawing Sheets

(56) References Cited

U.S. PATENT DOCUMENTS

2012/0299389 A1* 11/2012 Lee .................... H04B 5/0031
307/104

FOREIGN PATENT DOCUMENTS

| JP | 2012-095435 A | 5/2012 |
| JP | 2012-100390 A | 5/2012 |

* cited by examiner

POWER SUPPLY APPARATUS, CONTROL METHOD, AND RECORDING MEDIUM

BACKGROUND

Field of the Invention

The present invention relates to a power supply apparatus that supplies power.

Description of the Related Art

Recently, there have been systems that include an electronic device having an integrated chip (IC) card function and a personal computer having a read/write function. This personal computer reads data from the electronic device and writes data to the electronic device when a user brings the electronic device close to the personal computer.

Japanese Patent Application Laid-Open No. 2003-32261 discusses a personal computer that, in such a system, acquires identification information from an electronic device when the electronic device is brought close to the personal computer, and performs communication based on Bluetooth® using the acquired identification information.

An electronic device having an IC card function may be operated using power supplied from a battery. However, in some cases, such an electronic device cannot perform communication based on Bluetooth® due to a decrease in the remaining capacity of the battery even if identification information about the electronic device can be transmitted to a personal computer having a read/write function. In this case, even if the electronic device starts transmission of video data to the personal computer by communication based on Bluetooth®, the transmission of video data may be interrupted due to the decrease in the remaining capacity of the battery in the electronic device. In such a case, the video data needs to be transmitted to the electronic device again, which places a burden on the user.

SUMMARY

Aspects of the present invention relate generally to a power supply apparatus and a control method capable of performing authentication for wireless communication based on a state of an electronic device.

According to an aspect of the present invention, a power supply apparatus includes a power supply unit that wirelessly supplies power to an electronic device, a first communication unit that communicates, based on a first communication method, with the electronic device, a second communication unit that communicates, based on a second communication method that is different from the first communication method, with the electronic device, and a control unit that controls the first communication unit so as to acquire authentication data for a communication between the second communication unit and the electronic device if a remaining capacity of a battery, connected to the electronic device, is equal to or more than a predetermined value.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the present invention and, together with the description, serve to explain the principles of the present invention.

DESCRIPTION OF THE EMBODIMENTS

Various exemplary embodiments, features, and aspects of the present invention will be described in detail below with reference to the drawings.

An exemplary embodiment of the present invention will now be described with reference to the drawings. However, the following exemplary embodiment is merely an example. The present invention is in no way limited to the following exemplary embodiment.

Figure 1:
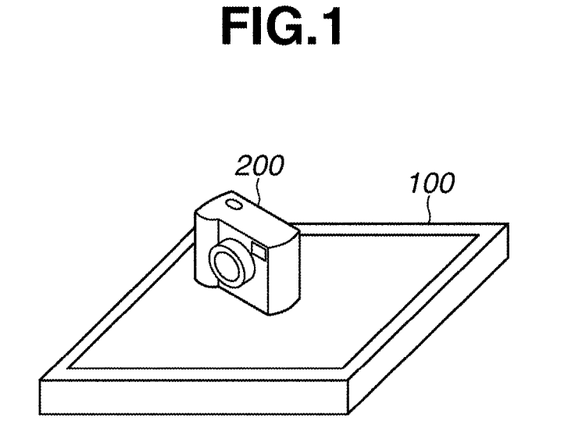
FIG. 1 is a diagram illustrating an example of a power supply system according to a first exemplary embodiment.

A first exemplary embodiment of the present invention will now be described with reference to the drawings. As illustrated in FIG. 1, a power supply system according to a first exemplary embodiment includes a power supply apparatus 100 and an electronic device 200. In the power supply system according to the first exemplary embodiment, when the distance between the power supply apparatus 100 and the electronic device 200 is within a predetermined range, the power supply apparatus 100 wirelessly supplies power to the electronic device 200. Further, when the electronic device 200 is within a predetermined range from the power supply apparatus 100, the electronic device 200 wirelessly receives power output from the power supply apparatus 100. In addition, when the electronic device 200 is not within a predetermined range from the power supply apparatus 100, the electronic device 200 cannot receive power from the power supply apparatus 100. This predetermined range is a range within which communication can be performed between the power supply apparatus 100 and the electronic device 200. The power supply apparatus 100 may wirelessly supplies power to a plurality of electronic devices. Further, the power supply apparatus 100 may be a communication apparatus that transmits at least one of image data and audio data to the electronic device 200, and receives at least one of image data and audio data from the electronic device 200. The image data may be still image data or moving image data.

The electronic device 200 may be an imaging apparatus, such as a camera, or a reproduction apparatus that reproduces audio data or image data. Further, the electronic device 200 may be a communication apparatus like a mobile telephone or a smartphone. In addition, the electronic device 200 may be a battery pack that includes a battery 212. Moreover, the electronic device 200 may be an apparatus like an automobile that is driven by power supplied from the power supply apparatus 100. Still further, the electronic device 200 may be an apparatus that receives a television broadcast, a display that displays image data, or a personal computer. The electronic device 200 may also be an apparatus that is operated using power supplied from the power supply apparatus 100 even when the battery 212 is not mounted.

Figure 2:
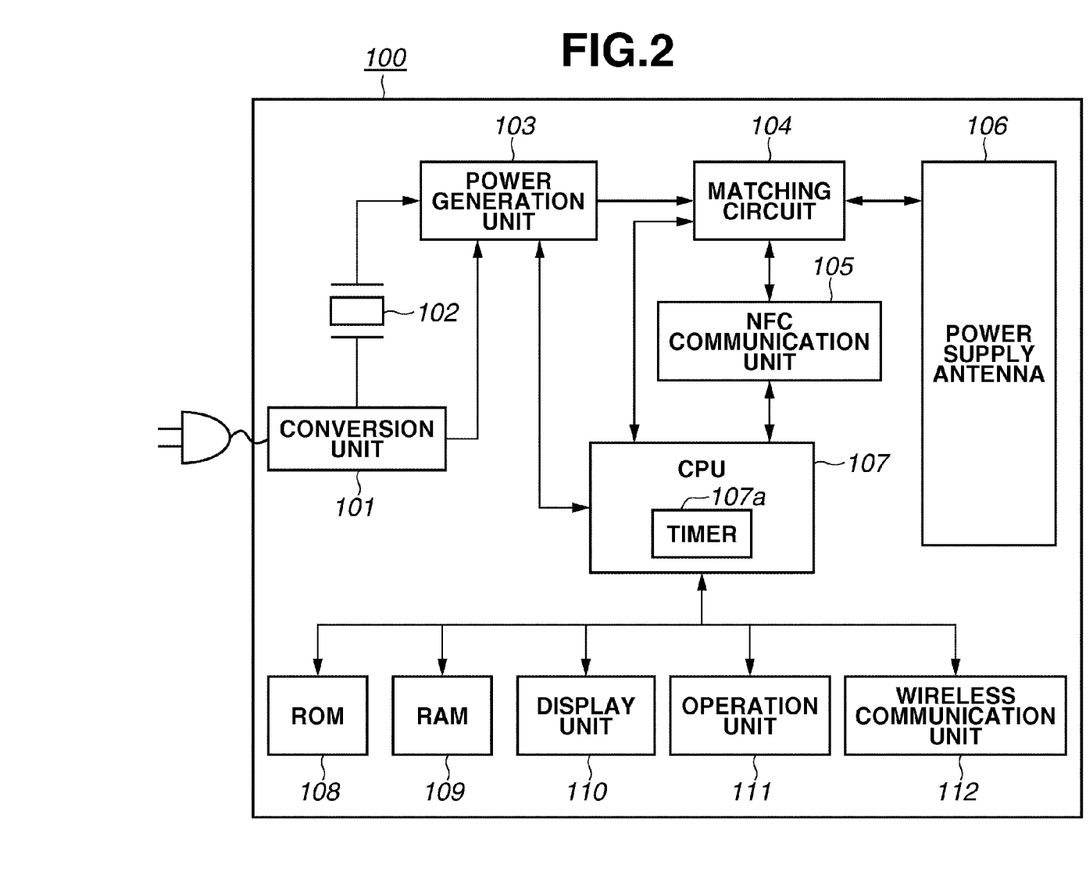
FIG. 2 is a block diagram illustrating an example of a power supply apparatus according to the first exemplary embodiment.

FIG. 2 is a block diagram illustrating the power supply apparatus 100 according to the first exemplary embodiment. As illustrated in FIG. 2, the power supply apparatus 100 includes a conversion unit 101, an oscillator 102, a power generation unit 103, a matching circuit 104, an near field communication (NFC) communication unit 105, a power supply antenna 106, a central processing unit (CPU) 107, a read-only memory (ROM) 108, a random-access memory (RAM) 109, a display unit 110, an operation unit 111, and a wireless communication unit 112.

When an alternating current (AC) power source (not illustrated) and the power supply apparatus 100 are connected, the conversion unit 101 converts the alternating power from the AC power source (not illustrated) into direct current power, and supplies the converted direct current power to the power supply apparatus 100.

The oscillator 102 oscillates at a frequency that is used to control the power generation unit 103 so that the power supplied from the conversion unit 101 is converted into a target power set by the CPU 107. A crystal oscillating element is used for the oscillator 102, for example.

The power generation unit 103 generates power for external output via the power supply antenna 106 based on the power supplied from the conversion unit 101 and the frequency generated by the oscillator 102. The power generation unit 103, which includes a field-effect transistor (FET) and the like, generates power for external output based on the frequency generated by the oscillator 102. The power generated by the power generation unit 103 is supplied to the matching circuit 104. The power generated by the power generation unit 103 includes a first power and a second power.

The power supply apparatus 100 performs wireless communication between the power supply apparatus 100 and the electronic device 200 based on the NFC standard. The first power is power that is supplied by the power supply apparatus 100 to the electronic device 200 to perform wireless communication based on the NFC (NFCIP-1 (ISO/IEC 18092) or NFCIP-2 (ISO/IEC 21481)) standard. The second power is power that is supplied by the power supply apparatus 100 to the electronic device 200 to charge the battery 212. For example, the first power may be 1 W or less, and the second power may be 2 W or more. The first power is lower than the second power. The first power is not limited to 1 W or less, as long as it can be used to perform wireless communication based on the NFC standard. Further, the second power is not limited to 2 W or more, as long as it can be used by the power supply apparatus 100 to charge the electronic device 200.

Figure 3:
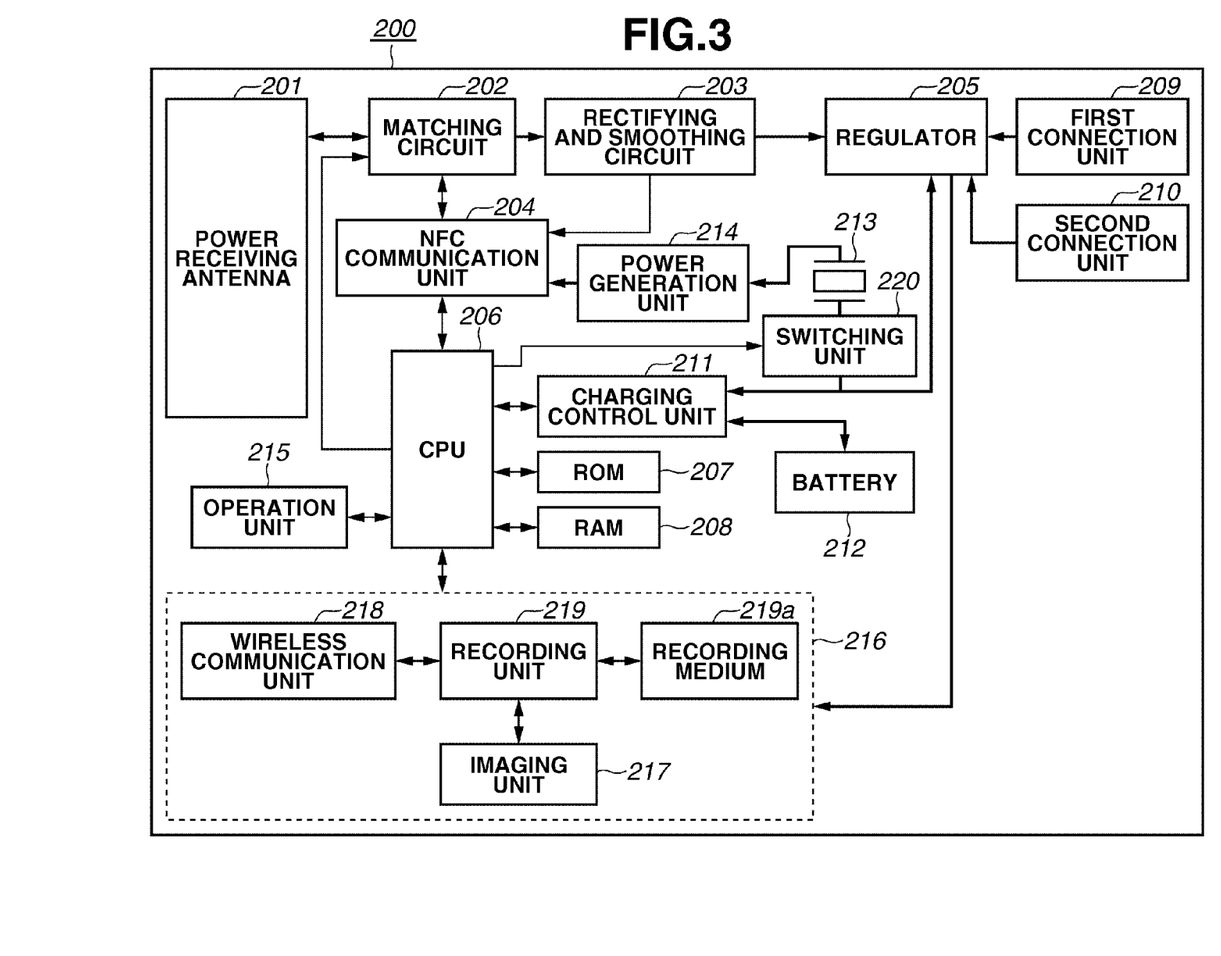
FIG. 3 is a block diagram illustrating an example of an electronic device according to the first exemplary embodiment.

The matching circuit 104 is a resonance circuit for causing resonance to occur between the power supply antenna 106 and a power receiving antenna 201 of the electronic device 200. The matching circuit 104 includes a circuit for impedance matching between the power generation unit 103 and the power supply antenna 106. The matching circuit 104 also includes a coil (not illustrated) and a capacitor (not illustrated).

When the power supply apparatus 100 outputs one of the first power and the second power, the CPU 107 controls a resonance frequency f of the power supply antenna 106 so as to be a predetermined frequency in order to cause resonance to occur between the power supply antenna 106 and the power receiving antenna 201 of the electronic device 200. In this case, the CPU 107 changes the resonance frequency f of the power supply antenna 106 by controlling an inductance value included in the matching circuit 104 and a capacitance value included in the matching circuit 104.

This predetermined frequency is a frequency used for performing wireless communication between the power supply apparatus 100 and the electronic device 200 based on the NFC standard. Further, this predetermined frequency is also a frequency used for causing resonance to occur between the power supply apparatus 100 and the electronic device 200. The predetermined frequency may be, for example, 13.56 MHz.

The matching circuit 104 can detect a current flowing through the power supply antenna 106, and detect the voltage supplied to the power supply antenna 106. The matching circuit 104 notifies the CPU 107 of the current value of the detected power supply antenna 106, and notifies the CPU 107 of the value of the detected voltage of the power supply antenna 106. In addition, the matching circuit 104 notifies the NFC communication unit 105 of the current value of the detected power supply antenna 106.

If the resonance frequency f of the power supply antenna 106 is 13.56 MHz, the NFC communication unit 105 performs wireless communication based on the NFC standard. If the resonance frequency f of the power supply antenna 106 is 13.56 MHz, and the power supply apparatus 100 is supplying the first power to the electronic device 200, the NFC communication unit 105 can perform wireless communication via the power supply antenna 106 based on the NFC standard. If the resonance frequency generated by the oscillator 102 is 13.56 MHz, and the power supply apparatus 100 is supplying the second power to the electronic device 200, the NFC communication unit 105 cannot perform wireless communication via the power supply antenna 106 based on the NFC standard.

Examples of modes for performing communication based on the NFC standard include a card emulation (NFC card emulation) mode, a read/write mode, and a bidirectional communication (peer to peer) mode. The card emulation mode, the read/write mode, and the bidirectional communication mode are modes for performing wireless communication based on the NFC standard. The bidirectional communication mode can also be called "P2P mode" or "peer mode".

The card emulation mode is a mode for using a function of an IC card that is capable of receiving a specific service, such as electronic payment. If an apparatus in the card emulation mode receives a command from an apparatus that is in the read/write mode, the apparatus can transmit data in response to the received command. However, since an apparatus in the card emulation mode cannot output the first power, this apparatus cannot transmit a command to an apparatus that is in the read/write mode. Further, if an apparatus that is in the read/write mode is not outputting the first power, an apparatus in the card emulation mode cannot transmit response data to the apparatus that is in the read/write mode.

The read/write mode is a mode for reading data from a device that supports the NFC standard, and writing data into a device that supports the NFC standard. An apparatus in the read/write mode can, while outputting the first power, transmit a command to an apparatus that is in the card emulation mode. Further, an apparatus in the read/write mode can, while outputting the first power, receive a data in response to a command from an apparatus that is in the card emulation mode.

The bidirectional communication mode is a mode for performing bidirectional communication between a plurality of apparatuses based on commands. The bidirectional communication mode is used for, for example, transmitting setting-related data of a wireless local area network (LAN)

or a Bluetooth pairing. An apparatus in the bidirectional communication mode can, while outputting the first power, transmit a command to another apparatus that is in the bidirectional communication mode. Further, an apparatus in the bidirectional communication mode can, while not outputting the first power, receive a data while also being supplied with the first power from another apparatus that is in the bidirectional communication mode.

The power supply apparatus 100 according to the first exemplary embodiment has the read/write mode and the bidirectional communication mode as modes for performing wireless communication based on the NFC standard. Further, the electronic device 200 according to the first exemplary embodiment has the card emulation mode and the bidirectional communication mode as modes for performing wireless communication based on the NFC standard.

If the power supply apparatus 100 is in either one of the read/write mode or the bidirectional communication mode, the NFC communication unit 105 superimposes a command on the first power, and transmits the superimposed command to the electronic device 200 via the power supply antenna 106. In this case, based on a protocol that supports the NFC standard, the NFC communication unit 105 performs amplitude shift keying (ASK) modulation on the first power generated by the power generation unit 103. The ASK modulation, which utilizes shifts in amplitude, is used in communication between an IC card and a card reader. The NFC communication unit 105 performs ASK modulation on the first power generated by the power generation unit 103 in order to generate a pulse signal corresponding to the command to be transmitted to the electronic device 200. Then, the NFC communication unit 105 transmits the generated pulse signal as a command to the electronic device 200 via the power supply antenna 106.

The electronic device 200 analyzes the pulse signal received from the power supply apparatus 100, acquires bit data including information about the "ones" and the "zeros", and performs the process indicated by the bit data. When the electronic device 200 is in the card emulation mode, and the power supply apparatus 100 is in the read/write mode, the electronic device 200 transmits data responding to the received command to the power supply apparatus 100 by modulating the negative charges included in the electronic device 200. When modulation of the load is performed by the electronic device 200, the current flowing to the power supply antenna 106 changes. Consequently, the NFC communication unit 105 can receive response data from the electronic device 200 by demodulating the current value of the power supply antenna 106 supplied from the matching circuit 104 with a demodulation circuit (not illustrated) included in the NFC communication unit 105.

If the power supply apparatus 100 is in the bidirectional communication mode and the electronic device 200 is in the bidirectional communication mode, the electronic device 200 can output the first power, superimpose a command on the first power, and transmit the superimposed command to power supply apparatus 100. In this case, the power supply apparatus 100 can receive the command from the electronic device 200 by demodulating the command superimposed on the first power with a demodulation circuit (not illustrated). Further, when the power supply apparatus 100 is in the bidirectional communication mode, the power supply apparatus 100 is configured so that the first power is not output via the power supply antenna 106 when a command is received from the electronic device 200.

The power supply antenna 106 is an antenna for external output of the power generated by the power generation unit 103. The power supply apparatus 100 supplies power to the electronic device 200 via the power supply antenna 106, and transmits commands to the electronic device 200 via the power supply antenna 106. Further, via the power supply antenna 106, the power supply apparatus 100 receives commands from the electronic device 200, and response data to the commands transmitted to the electronic device 200.

The CPU 107 controls the power supply apparatus 100 by executing a computer program stored in the ROM 108. The CPU 107 controls the power supplied to the electronic device 200 by controlling the power generation unit 103.

The ROM 108 stores computer programs for controlling the power supply apparatus 100 and information about parameters and the like relating to the power supply apparatus 100.

The RAM 109, which is a rewritable memory, records computer programs for controlling the power supply apparatus 100, information about parameters and the like relating to the power supply apparatus 100, and data received from the electronic device 200 by the NFC communication unit 105.

The display unit 110 displays video data supplied from one of the RAM 109 and the ROM 108.

The operation unit 111 provides a user interface for operating the power supply apparatus 100. The operation unit 111 includes, for example, a power button for the power supply apparatus 100 and a mode switching button for the power supply apparatus 100. These buttons may be configured from a switch, a touch panel, or the like. The CPU 107 controls the power supply apparatus 100 based on input signals input via the operation unit 111.

The wireless communication unit 112 performs wireless communication that is different from the wireless communication based on the NFC standard. The wireless communication unit 112 performs wireless communication for a longer communication distance than the wireless communication based on the NFC standard. Further, the wireless communication unit 112 performs wireless communication using a different frequency bandwidth from that for the wireless communication based on the NFC standard. For example, the wireless communication unit 112 may perform wireless communication based on a wireless LAN standard.

Next, an example of the configuration of the electronic device 200 will be described with reference to FIG. 3. The electronic device 200 includes a power receiving antenna 201, a matching circuit 202, a rectifying and smoothing circuit 203, an NFC communication unit 204, a regulator 205, a CPU 206, a ROM 207, a RAM 208, a first connection unit 209, a second connection unit 210, a charging control unit 211, a battery 212, an oscillator 213, a power generation unit 214, an operation unit 215, a system 216, and a switching unit 220.

The power receiving antenna 201 is an antenna for receiving power supplied from the power supply apparatus 100. Via the power receiving antenna 201, the electronic device 200 receives power from the power supply apparatus 100 and performs wireless communication based on the NFC standard with the power supply apparatus 100. Further, if the electronic device 200 has received a command from the power supply apparatus 100 via the power receiving antenna 201, the electronic device 200 transmits data in response to the command received from the power supply apparatus 100 to the power supply apparatus 100 via the power receiving antenna 201. In addition, the electronic device 200 transmits a command to the power supply apparatus 100 via the power receiving antenna 201.

The matching circuit 202 is a resonance circuit for causing resonance to occur between the power supply antenna 106 and the power receiving antenna 201 based on the same frequency as the resonance frequency f of the power supply antenna 106. The matching circuit 202 includes a circuit for impedance matching between the power receiving antenna 201 and the rectifying and smoothing circuit 203. The matching circuit 202 also includes a coil (not illustrated) and a capacitor (not illustrated). The CPU 206 controls the value of the coil and the value of the capacitor that are included in the matching circuit 202 so that the power receiving antenna 201 has the same frequency as the resonance frequency f of the power supply antenna 106. Further, the matching circuit 202 supplies the power received by the power receiving antenna 201 to the rectifying and smoothing circuit 203.

The rectifying and smoothing circuit 203 removes commands and noise from the power supplied from the matching circuit 202, and generates direct current power. Further, the rectifying and smoothing circuit 203 supplies the generated direct current power to the regulator 205. The rectifying and smoothing circuit 203 supplies the commands removed from the power received by the power receiving antenna 201 to the NFC communication unit 204.

The NFC communication unit 204 performs wireless communication based on the NFC standard. When the electronic device 200 is in one of the card emulation mode and the bidirectional communication mode, the NFC communication unit 204 analyzes the command received from the rectifying and smoothing circuit 203 based on the protocol of the NFC standard, and supplies the analysis result of the command to the CPU 206. When the electronic device 200 is in the card emulation mode, and the first power is being supplied from the power supply apparatus 100 to the electronic device 200, the CPU 206 transmits data in response to the received command to the power supply apparatus 100. In this case, the CPU 206 controls the NFC communication unit 204 so that the load included in the NFC communication unit 204 changes in order to transmit the data in response to the received command to the power supply apparatus 100.

The CPU 206 controls the regulator 205 to supply the power supplied from any one of the rectifying and smoothing circuit 203, the battery 212, the first connection unit 209, and the second connection unit 210 to the electronic device 200. The regulator 205 supplies the power supplied from the power supply apparatus 100 via the rectifying and smoothing circuit 203 to the electronic device 200 based on an instruction from the CPU 206. The regulator 205 supplies the discharge power supplied from the battery 212 via the charging control unit 211 to the electronic device 200 based on an instruction from the CPU 206. The regulator 205 supplies the power supplied via the first connection unit 209 to the electronic device 200 based on an instruction from the CPU 206. The regulator 205 supplies the power supplied via the second connection unit 210 to the electronic device 200 based on an instruction from the CPU 206.

Based on the analysis result of the command supplied from the NFC communication unit 204, the CPU 206 determines what type of command the command received by the NFC communication unit 204 is, and controls the electronic device 200 so as to perform the process and operations instructed by the received command. Further, the CPU 206 controls the electronic device 200 by executing a computer program stored in the ROM 207.

The ROM 207 stores the computer programs for controlling the electronic device 200. Further, information relating to the electronic device 200 is recorded in the ROM 207. The RAM 208, which is a rewritable memory, records computer programs for controlling the electronic device 200 and data transmitted from the power supply apparatus 100.

The first connection unit 209 includes a terminal for connecting a commercial power source (not illustrated). When the first connection unit 209 and the commercial power source are connected, the first connection unit 209 detects that the electronic device 200 and the commercial power source are connected. When the first connection unit 209 and the commercial power source are not connected, the first connection unit 209 detects that the electronic device 200 and the commercial power source are not connected. When the first connection unit 209 and the commercial power source are connected, the first connection unit 209 converts the alternating power from the commercial power source into direct current power, and supplies the converted direct current power to the regulator 205.

The second connection unit 210 includes a terminal for connecting an external power source apparatus. In the first exemplary embodiment, the second connection unit 210 is connected to an external power source apparatus via a universal serial bus (USB) cable. In this case, the external power source apparatus is a host device capable of supplying power to the electronic device 200 via the USB cable. For example, the external power source apparatus may be a personal computer.

When the second connection unit 210 and the external power source apparatus are connected via a USB cable, the second connection unit 210 detects that the electronic device 200 and the external power source apparatus are connected. When the second connection unit 210 and the external power source apparatus are not connected via a USB cable, the second connection unit 210 detects that the electronic device 200 and the external power source apparatus are not connected. When the second connection unit 210 and the external power source apparatus are connected, the second connection unit 210 supplies the power supplied from the external power source apparatus to the regulator 205.

When power from any one of the rectifying and smoothing circuit 203, the first connection unit 209, and the second connection unit 210 is supplied from the regulator 205 to the charging control unit 211, the charging control unit 211 performs charging of the battery 212 using the power supplied from the regulator 205. Further, when power is discharged from the battery 212, the charging control unit 211 supplies the discharged power supplied from the battery 212 to the regulator 205. The charging control unit 211 periodically detects information indicating the remaining capacity of the battery 212 and information relating to charging of the battery 212, and notifies the CPU 206 of the detected information.

The battery 212 can be attached to and detached from the electronic device 200. The battery 212 is a chargeable secondary battery, such as a lithium ion battery. In addition, the battery 212 may be a battery other than a lithium ion battery.

When the electronic device 200 is in the bidirectional communication mode, the oscillator 213 oscillates at a frequency that is used to control the power generation unit 214 so that the power supplied from the regulator 205 via the switching unit 220 is a target power set by the CPU 206. A crystal oscillating element is used for the oscillator 213, for example. When the electronic device 200 is in the card emulation mode, the CPU 206 stops operation of the oscillator 213 by controlling the switching unit 220 so that the oscillator 213 and the regulator 205 are not connected.

When the electronic device 200 is in the bidirectional communication mode, the power generation unit 214 generates power for external output via the power receiving antenna 201 based on the power supplied from the regulator 205 and the frequency generated by the oscillator 213. The power generation unit 214, which includes an FET and the like, generates power for external output based on the frequency generated by the oscillator 213. The power generated by the power generation unit 214 is supplied to the NFC communication unit 204. The power generated by the power generation unit 214 is a third power. The third power is power supplied by the electronic device 200 to the power supply apparatus 100 for performing wireless communication based on the NFC standard. When the electronic device 200 is in the card emulation mode, the CPU 206 stops operation of the power generation unit 214 by controlling the switching unit 220 so as not to connect the oscillator 213 and the regulator 205. When the electronic device 200 is in the bidirectional communication mode, the NFC communication unit 204 superimposes a command on the third power supplied from the power generation unit 214, and transmits the command superimposed on the third power to the power supply apparatus 100 via the power receiving antenna 201.

The operation unit 215 is a user interface for operating the electronic device 200. The operation unit 215 includes, for example, a power button for operating the electronic device 200 and a mode switching button for the electronic device 200. These buttons may be configured from a switch, a touch panel, or the like. When the operation unit 215 has been operated by the user, the operation unit 215 supplies a signal corresponding to the operation performed by the user to the CPU 206. The operation unit 215 may also control the electronic device 200 based on a remote control signal received from a remote controller (not illustrated).

The system 216 includes an imaging unit 217, a wireless communication unit 218, and a recording unit 219. The imaging unit 217 includes, for example, an image sensor for generating image data from an optical image of an object, an image processing circuit that performs image process on the image data generated by the image sensor, and a compression/decompression circuit for compressing the image data and decompressing compressed image data. The imaging unit 217 captures an image of the object, and supplies to the recording unit 219 image data, such as a still image or a moving image, obtained based on the result of image capturing. The recording unit 219 records the image data supplied from the imaging unit 217 to a recording medium 219a. The imaging unit 217 may further include other parts that are necessary for capturing an image of the object.

The wireless communication unit 218 can transmit image data and audio data recorded in the ROM 207 or the recording medium 219a to the power supply apparatus 100, and receive image data and audio data from the power supply apparatus 100.

The wireless communication unit 218 performs transmission and reception of image data and audio data based on a communication protocol common with the wireless communication unit 112. For example, similar to the wireless communication unit 112, the wireless communication unit 218 performs wireless communication based on the wireless LAN standard.

The recording unit 219 records the data, such as image data and audio data, supplied from one of the wireless communication unit 218 and the imaging unit 217, on the recording medium 219a.

Further, the recording unit 219 can also read data, such as image data and audio data, from the recording medium 219a, and supply the read data to one of the RAM 208 and the wireless communication unit 218. The recording medium 219a may be, for example, a hard disk or a memory. Further, the recording medium 219a may be included in the electronic device 200, or may be an external recording medium that can be attached to and detached from the 200.

The system 216 includes means to which power is supplied from the regulator 205 when the electronic device 200 is ON. Consequently, in addition to the imaging unit 217, the wireless communication unit 218, the recording unit 219, and the recording medium 219a, the system 216 may further include, for example, display means for displaying image data, and means for sending and receiving e-mails.

The switching unit 220 includes a switch for connecting the oscillator 213 and the regulator 205. When the switching unit 220 is ON, the oscillator 213 and the regulator 205 are connected. When the switching unit 220 is not ON, the oscillator 213 and the regulator 205 are not connected. When the electronic device 200 is in the card emulation mode, the CPU 206 controls the switching unit 220 so as to be OFF. When the electronic device 200 is in the bidirectional communication mode, the CPU 206 controls the switching unit 220 so as to be ON.

The power supply antenna 106 and the power receiving antenna 201 may be a helical antenna, a loop antenna, or a flat antenna such as a meandering antenna.

In the first exemplary embodiment, although the power supply apparatus 100 performs wireless power supply to the electronic device 200 based on the magnetic field resonance method, the present invention is not limited to this.

For example, instead of the magnetic field resonance method, the power supply apparatus 100 may perform wireless power supply to the electronic device 200 based on an electromagnetic field coupling method. In this case, the power supply apparatus 100 and the electronic device 200 both need to be provided with an electrode, and power needs to be supplied from the power supply apparatus 100 electrode to the electronic device 200 electrode.

Further, for example, instead of the magnetic field resonance method, the power supply apparatus 100 may also perform wireless power supply to the electronic device 200 based on electromagnetic induction.

In addition, for example, instead of the magnetic field resonance method, the power supply apparatus 100 may also perform wireless power supply to the electronic device 200 based on a standard ("Qi") prescribed by the Wireless Protocol Consortium (WPC).

Still further, for example, instead of the magnetic field resonance method, the power supply apparatus 100 may also perform wireless power supply to the electronic device 200 based on a standard prescribed by Wireless Power Transmission (WPT).

Moreover, for example, instead of the magnetic field resonance method, the power supply apparatus 100 may also perform wireless power supply to the electronic device 200 based on a standard prescribed by the Consumer Electronics Association (CEA)).

Further, for example, instead of the magnetic field resonance method, the power supply apparatus 100 may also perform wireless power supply to the electronic device 200 based on a standard prescribed by the Broadband Wireless Forum (BWF).

In addition, for example, instead of the magnetic field resonance method, the power supply apparatus 100 may also perform wireless power supply to the electronic device 200 based on a standard prescribed by the Telecommunications Technology Association (TTA).

In the above description, the power supply apparatus 100 wirelessly supplies power to the electronic device 200. However, the term "wireless" may be replaced with the terms "non-contact" or "contactless".

In the first exemplary embodiment, the power supply apparatus 100 performs wireless communication with the electronic device 200 based on the NFC standard. Consequently, the CPU 107 performs control so that in the power supply apparatus 100 the resonance frequency f of the power supply antenna 106 is 13.56 MHz.

<Authentication Process>

Figure 4:
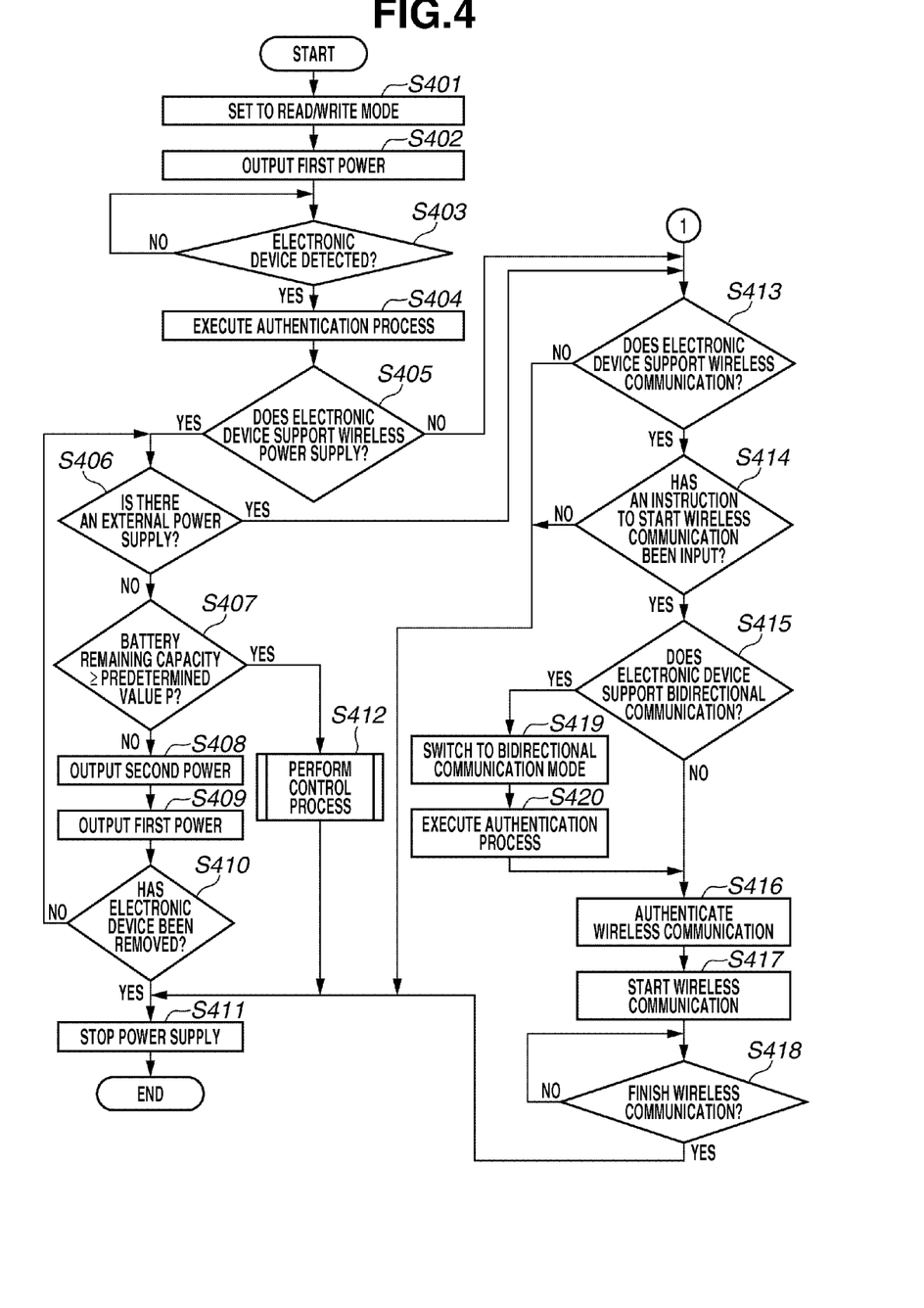
FIG. 4 is a flowchart illustrating an example of an authentication process performed by a power supply apparatus according to the first exemplary embodiment.

In the first exemplary embodiment, the authentication process performed by the power supply apparatus 100 will be described with reference to a flowchart illustrated in FIG. 4. The authentication process illustrated in FIG. 4 can be realized by the CPU 107 executing a computer program stored in the ROM 108. When the authentication process illustrated in FIG. 4 is performed, the electronic device 200 is in the card emulation mode, and the switching unit 220 is OFF. Further, when the authentication process illustrated in FIG. 4 is performed, the electronic device 200 and the battery 212 are connected.

In step S401, the CPU 107 sets the power supply apparatus 100 to the read/write mode, and then the process proceeds to step S402.

In step S402, the CPU 107 controls the oscillator 102, the power generation unit 103, and the matching circuit 104 to output the first power via the power supply antenna 106 in order to detect whether the electronic device 200 is within a predetermined range, and then the process proceeds to step S403.

In step S403, the CPU 107 determines whether the electronic device 200 has been detected within the predetermined range. If it is determined by the CPU 107 that the electronic device 200 has been detected within the predetermined range (YES in step S403), the process proceeds to step S404. If it is determined by the CPU 107 that the electronic device 200 has not been detected within the predetermined range (NO in step S403), the process returns to step S403.

In step S404, the CPU 107 performs authentication process based on the NFC standard. Examples of the authentication process based on the NFC standard include the processing prescribed in ISO/IEC 18092 and ISO/IEC 14443. Further examples of authentication process based on the NFC standard include process prescribed in ISO/IEC 21481. Further examples of authentication process based on the NFC standard include process based on the NFC-DEP protocol and process based on the ISO-DEP protocol. If it is determined that there is a plurality of electronic devices 200 within the predetermined range, the CPU 107 performs anti-collision process, and authenticates a selected electronic device. The authentication process based on the NFC standard may be, for example, process for acquiring a near field communication identifier (NFC ID) from the electronic device 200.

When an NFC ID is acquired from the electronic device 200, the CPU 107 records the acquired NFC ID in the RAM 109. Further, the CPU 107 determines the type of device of the electronic device 200 in the NFC standard based on the acquired NFC ID, and controls the NFC communication unit 105 so as to perform wireless communication based on the type of the electronic device 200. In this case, the process proceeds to step S405.

In step S405, the CPU 107 controls the NFC communication unit 105 so as to transmit a first command for confirming whether the electronic device 200 is a device that can support wireless power supply, to the electronic device 200 via the power supply antenna 106. When response data corresponding to the first command is received from the electronic device 200, the CPU 107 uses the response data corresponding to the first command to determine whether the electronic device 200 is a device that can handle wireless power supply. If it is determined by the CPU 107 that the electronic device 200 is a device that can support wireless power supply (YES in step S405), the process proceeds to step S406. If it is determined by the CPU 107 that the electronic device 200 is not a device that can support wireless power supply (NO in step S405), the process proceeds to step S413.

In step S406, the CPU 107 controls the NFC communication unit 105 so as to transmit a second command for confirming whether the electronic device 200 is being supplied with power from at least one of a commercial power source and an external power source, to the electronic device 200 via the power supply antenna 106. When response data corresponding to the second command is received from the electronic device 200, the CPU 107 uses the response data corresponding to the second command to determine whether the electronic device 200 is being supplied with power from at least one of a commercial power source and an external power source. If it is determined by the CPU 107 that the electronic device 200 is being supplied with power from at least one of a commercial power source and an external power source (YES in step S406), the process proceeds to step S413. If it is determined by the CPU 107 that the electronic device 200 is not being supplied with power from at least one of a commercial power source and an external power source (NO in step S406), the CPU 107 determines that the electronic device 200 is supplied with power from the battery 212, and the process proceeds to step S407.

In step S407, the CPU 107 determines whether the remaining capacity of the battery 212 connected to the electronic device 200 is equal to or greater than a predetermined value P. In this case, the CPU 107 controls the NFC communication unit 105 so as to transmit a third command for requesting the remaining capacity of the battery 212 connected to the electronic device 200, to the electronic device 200 via the power supply antenna 106. When response data corresponding to the third command is received from the electronic device 200, the CPU 107 uses the response data corresponding to the third command to determine whether the remaining capacity of the battery 212 is equal to or greater than the predetermined value P. The predetermined value P is a value indicating the power required by the electronic device 200 to start the system 216. Further, the predetermined value P is a value indicating the power required by the wireless communication unit 218 to perform wireless communication. The predetermined value P may be acquired by the NFC communication unit 105 from the electronic device 200, or may be a value stored in advance in the ROM 108.

If it is determined by the CPU 107 that the remaining capacity of the battery 212 is equal to or greater than the predetermined value P (YES in step S407), the CPU 107 determines that the system 216 can be started by the electronic device 200 using the power supplied from the battery 212. For example, when the remaining capacity of the battery 212 is equal to or greater than the predetermined value P, if an instruction to operate the wireless communication unit 218 is input into the electronic device 200, the electronic device 200 can operate the wireless communication unit 218 using the battery 212 without having to receive power from the power supply apparatus 100. Consequently, when the remaining capacity of the battery 212 is equal to or greater than the predetermined value P, the electronic device 200 receives the instruction to start the system 216 via the operation unit 215, and performs the operation corresponding to the instruction input via the operation unit 215. Therefore, if it is determined that the remaining capacity of the battery 212 is equal to or greater than the predetermined value P (YES in step S407), the process proceeds to step S412. If it is determined by the CPU 107 that the remaining capacity of the battery 212 is not equal to or greater than the predetermined value P (NO in step S407), the CPU 107 determines that the system 216 cannot be started by the electronic device 200 using the power supplied from the battery 212. For example, when the remaining capacity of the battery 212 is not equal to or greater than the predetermined value P, the electronic device 200 cannot operate the wireless communication unit 218 using the battery 212 even if an instruction to operate the wireless communication unit 218 is input into the electronic device 200. Therefore, when the remaining capacity of the battery 212 is not equal to or greater than the predetermined value P, even if an instruction to start the system 216 is input via the operation unit 215, the electronic device 200 does not perform the operation corresponding to the instruction input via the operation unit 215. Therefore, if it is determined that the remaining capacity of the battery 212 is not equal to or greater than the predetermined value P (NO in step S407), the process proceeds to step S408.

In step S408, the CPU 107 stops outputting the first power, and controls the oscillator 102, the power generation unit 103, and the matching circuit 104 so as to output the second power via the power supply antenna 106. The CPU 107 sets the value of the second power based on the remaining capacity of the battery 212. Further, the CPU 107 controls a timer 107a so as to measure the time that has elapsed since the second power was output via the power supply antenna 106. If the time measured by the timer 107a is equal to or greater than a predetermined time T, the process proceeds to step S409.

If the time measured by the timer 107a is not equal to or greater than the predetermined time T, the CPU 107 outputs the second power via the power supply antenna 106 until the time measured by the timer 107a is equal to or greater than the predetermined time T.

In step S409, the CPU 107 stops outputting the second power, and controls the oscillator 102, the power generation unit 103, and the matching circuit 104 so as to output the first power via the power supply antenna 106. In this case, in order to acquire from the electronic device 200 information indicating the remaining capacity of the battery 212 and information indicating a state of the electronic device 200, the CPU 107 outputs the first power and performs wireless communication based on the NFC standard. Then, the process proceeds to step S410.

In step S410, the CPU 107 determines whether the electronic device 200 has been removed from the predetermined range. If it is determined by the CPU 107 that the electronic device 200 has been removed from the predetermined range (YES in step S410), the process proceeds to step S411. If it is determined by the CPU 107 that the electronic device 200 has not been removed from the predetermined range (NO in step S410), the processing returns to step S406.

In step S411, the CPU 107 controls at least one of the oscillator 102, the power generation unit 103, and the matching circuit 104 so as not to output the first power and the second power via the power supply antenna 106. Then, the process performed in this flowchart is terminated.

In step S412, the CPU 107 performs control process. This control process will be described below.

After the control process has been performed, the process proceeds to step S411.

In step S413, the CPU 107 controls the NFC communication unit 105 so as to transmit a fourth command for confirming whether the electronic device 200 is a device capable of performing wireless communication based on the wireless LAN to the electronic device 200 via the power supply antenna 106. When response data corresponding to the fourth command is received from the electronic device 200, the CPU 107 uses the response data corresponding to the fourth command to determine whether the electronic device 200 is a device capable of performing wireless communication based on the wireless LAN. If it is determined by the CPU 107 that the electronic device 200 is a device capable of performing wireless communication based on the wireless LAN (YES in step S413), the process proceeds to step S414. If it is determined by the CPU 107 that the electronic device 200 is not a device capable of performing wireless communication based on the wireless LAN (NO in step S413), the process proceeds to step S411.

In step S414, the CPU 107 determines whether an instruction to start wireless communication based on the wireless LAN has been detected. For example, if an instruction to start wireless communication based on the wireless LAN has been input into the power supply apparatus 100 via the operation unit 111, the CPU 107 determines that an instruction to start wireless communication based on the wireless LAN has been detected. Further, if it is determined that an instruction to start wireless communication based on the wireless LAN was received by the NFC communication unit 105, the CPU 107 determines that an instruction to start wireless communication based on the wireless LAN has been detected.

If it is determined by the CPU 107 that an instruction to start wireless communication based on the wireless LAN has been detected (YES in step S414), the process proceeds to step S415. If it is determined by the CPU 107 that an instruction to start wireless communication based on the wireless LAN has not been detected (NO in step S414), the process proceeds to step S411.

In step S415, the CPU 107 controls the NFC communication unit 105 so as to transmit a fifth command for confirming whether the electronic device 200 supports the bidirectional communication mode, to the electronic device 200 via the power supply antenna 106. When response data corresponding to the fifth command is received from the electronic device 200, the CPU 107 uses the response data corresponding to the fifth command to determine whether the electronic device 200 supports the bidirectional communication mode. If it is determined by the CPU 107 that the electronic device 200 supports the bidirectional communication mode (YES in step S415), the process proceeds to step S419. If it is determined by the CPU 107 that the electronic device 200 does not support the bidirectional communication mode (NO in step S415), the process proceeds to step S416.

In step S416, the CPU 107 controls the NFC communication unit 105 so as to perform authentication for wireless communication based on the wireless LAN. In this case, the CPU 107 controls the NFC communication unit 105 so as to transmit a sixth command for requesting first information to be used to perform wireless communication between the wireless communication unit 112 and the wireless communication unit 218, to the electronic device 200 via the power supply antenna 106. When response data corresponding to the sixth command is received from the electronic device 200, the CPU 107 records the first information included in the response data corresponding to the sixth command in the RAM 109. The first information includes information indicating the IP address of the wireless communication unit 218, information indicating a service set identifier (SSID) of the wireless communication unit 218, and information regarding encryption of the wireless communication unit 218. In addition, the first information may also include information indicating an extended service set identifier (ESSID) of the wireless communication unit 218.

Further, the CPU 107 controls the NFC communication unit 105 so as to transmit a seventh command for notifying second information to be used to perform wireless communication between the wireless communication unit 112 and the wireless communication unit 218, to the electronic device 200 via the power supply antenna 106. The second information is recorded in advance in the RAM 109 or the ROM 108. The second information includes information indicating the IP address of the wireless communication unit 112, information indicating the SSID of the wireless communication unit 112, and information regarding encryption of the wireless communication unit 112. In addition, the second information may also include information indicating the ESSID of the wireless communication unit 112. Then, the process proceeds to step S417.

In step S417, using the first information acquired from the electronic device 200, the CPU 107 controls the wireless communication unit 112 so as to perform wireless communication based on the wireless LAN standard. For example, the CPU 107 may control the wireless communication unit 112 so as to acquire from the electronic device 200 at least one of image data and audio data that has not been acquired by the power supply apparatus 100. Further, for example, the CPU 107 may control the wireless communication unit 112 so as to acquire from the electronic device 200 at least one of image data and audio data that has been selected by the user. For example, the CPU 107 may control the wireless communication unit 112 so as to transmit to the electronic device 200 at least one of image data and audio data that has not been acquired by the electronic device 200. Further, for example, the CPU 107 may control the wireless communication unit 112 so as to transmit to the electronic device 200 at least one of image data and audio data that has been selected by the user. Then, the processing proceeds to step S418.

In step S418, the CPU 107 determines whether to finish the wireless communication based on the wireless LAN standard. For example, if an instruction to finish the wireless communication based on the wireless LAN standard has been input from the user into the power supply apparatus 100, the CPU 107 determines that the wireless communication based on the wireless LAN standard is to be finished. Further, if the transmission by the wireless communication unit 112 of at least one of image data and audio data has been completed, the CPU 107 determines that the wireless communication based on the wireless LAN standard is to be finished. In addition, if the reception by the wireless communication unit 112 of at least one of the image data and audio data has been completed, the CPU 107 determines that the wireless communication based on the wireless LAN standard is to be finished. If it is determined by the CPU 107 that the wireless communication based on the wireless LAN standard is to be finished (YES in step S418), the processing proceeds to step S411. In this case (YES in step S418), the CPU 107 stops the operation of the wireless communication unit 112. If it is not determined by the CPU 107 that the wireless communication based on the wireless LAN standard is to be finished (NO in step S418), the process returns to step S418. In this case (NO in step S418), the process in step S418 is repeated, and the wireless communication based on the wireless LAN standard is continued.

In step S419, the CPU 107 switches the power supply apparatus 100 from the read/write mode to the bidirectional communication mode. Further, the CPU 107 controls the NFC communication unit 105 so as to transmit an eighth command for switching the electronic device 200 to the bidirectional communication mode, to the electronic device 200 via the power supply antenna 106. When the eighth command is received, the CPU 206 connects the oscillator 213 and the regulator 205 by turning on the switching unit 220, and changes the electronic device 200 to the bidirectional communication mode. When response data corresponding to the eighth command is received from the electronic device 200, the CPU 107 detects that the electronic device 200 has been switched to the bidirectional communication mode. Then, the process proceeds to step S420.

In step S420, the CPU 107 performs authentication process based on the NFC standard in the same manner as in step S404. Then, the process proceeds to step S416.

When the process of step S416 is performed after the process of step S419 is performed, in step S416, the CPU 107 controls the NFC communication unit 105 so as to transmit the seventh command to the electronic device 200 via the power supply antenna 106. After the seventh command has been transmitted, the CPU 107 controls the oscillator 102, the power generation unit 103, and the matching circuit 104 so as to stop outputting the first power. In this step, the CPU 107 waits until a ninth command for notifying first information is received from the electronic device 200. When the ninth command is received, the CPU 107 acquires the first information included in the ninth command, and records the first information in the RAM 109. Then, the process proceeds to step S417.

Although, in step S401, the CPU 107 has set the power supply apparatus 100 to the read/write mode, the present invention is not limited to this. For example, in step S401, the CPU 107 may set the power supply apparatus 100 to the bidirectional communication mode. In this case, when the authentication process of FIG. 4 is performed, the electronic device 200 may be in the bidirectional communication mode. Further, the CPU 107 may perform the process of step S404 before the process of step S401.

Although, in step S420, authentication process based on the NFC standard was performed, the process of step S420 may also be performed by the CPU 107 temporarily stopping outputting the first power before the process of step S420 is performed, and then performing the process of step S420 after the output of first power is started.

<Control Process>

In the first exemplary embodiment, the control process performed by the power supply apparatus 100 in step S412 of the authentication process illustrated FIG. 4 will be described with reference to the flowchart of FIG. 5. The control process illustrated in FIG. 5 can be realized by the CPU 107 executing a computer program stored in the ROM 108. The CPU 107 performs the control process illustrated in FIG. 5 for a case in which the power supply apparatus 100 is in the read/write mode. When the control process illustrated in FIG. 5 is performed, the electronic device 200 is in the card emulation mode, and the switching unit 220 is OFF.

Figure 5:
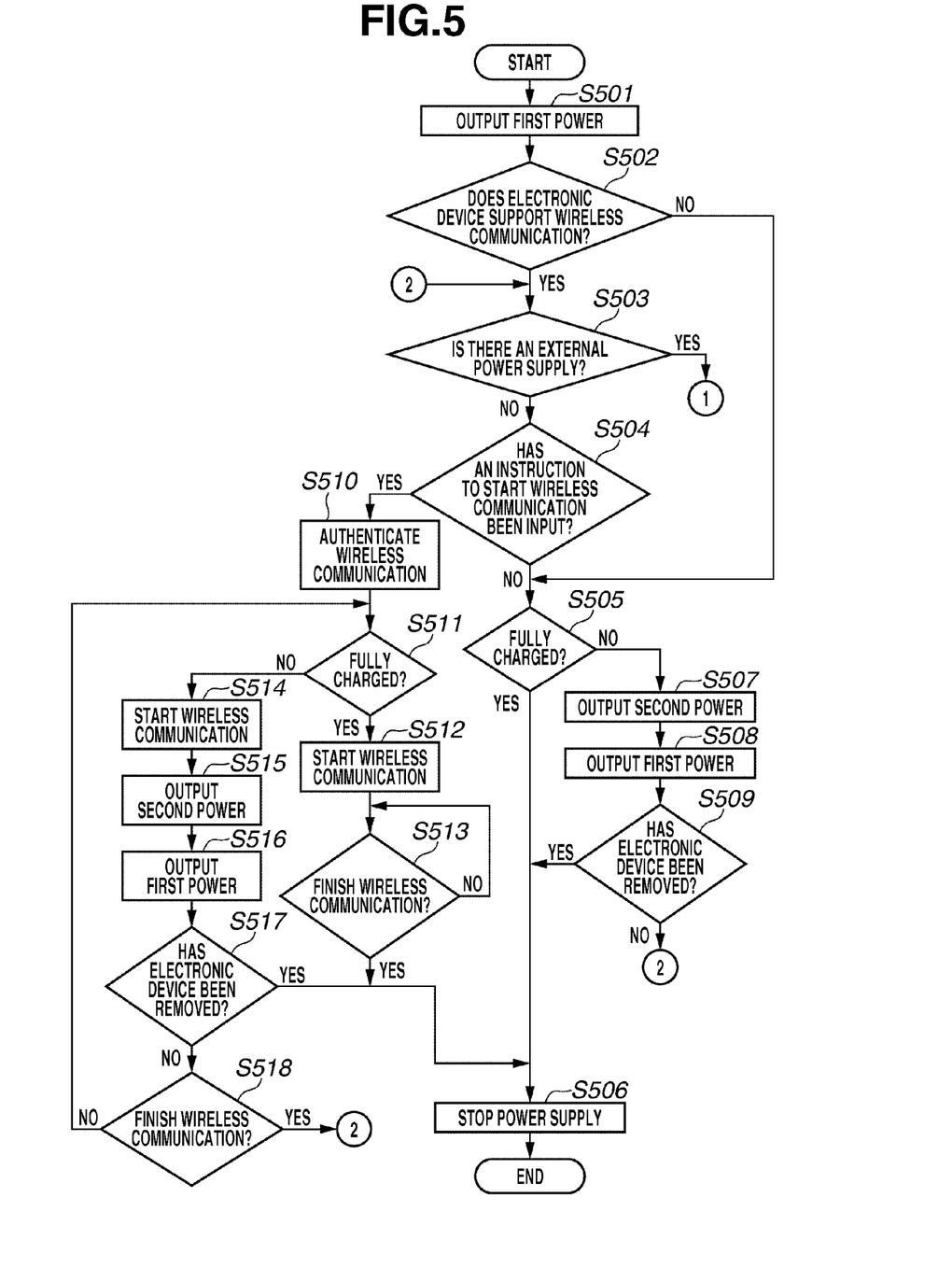
FIG. 5 is a flowchart illustrating an example of control process performed by a power supply apparatus according to the first exemplary embodiment.

Further, when the control process illustrated in FIG. 5 is performed, the electronic device 200 and the battery 212 are connected.

In step S501, the CPU 107 controls the oscillator 102, the power generation unit 103, and the matching circuit 104 so as to output the first power via the power supply antenna 106, and then the process proceeds to step S502.

In step S502, in the same manner as in step S413, the CPU 107 determines whether the electronic device 200 is a device capable of performing wireless communication based on the wireless LAN. If it is determined by the CPU 107 that the electronic device 200 is a device capable of performing wireless communication based on the wireless LAN (YES in step S502), the process proceeds to step S503. If it is determined by the CPU 107 that the electronic device 200 is not a device capable of performing wireless communication based on the wireless LAN (NO in step S502), the process proceeds to step S505.

In step S503, in the same manner as in step S406, the CPU 107 determines whether the electronic device 200 is being supplied with power from at least one of a commercial power source and an external power source. If it is determined by the CPU 107 that the electronic device 200 is being supplied with power from at least one of the commercial power source and the external power source (YES in step S503), the process performed in this flowchart is terminated. Then, the CPU 107 performs the process of steps S413 to S420 of the authentication process illustrated in FIG. 4. If it is determined by the CPU 107 that the electronic device 200 is not being supplied with power from at least one of a commercial power source and an external power source (NO in step S503), the process proceeds to step S504.

In step S504, in the same manner as in step S414, the CPU 107 determines whether an instruction to start wireless communication based on the wireless LAN has been detected. If it is determined by the CPU 107 that an instruction to start wireless communication based on the wireless LAN has been detected (YES in step S504), the process proceeds to step S510. If it is determined by the CPU 107 that an instruction to start wireless communication based on the wireless LAN has not been detected (NO in step S504), the process proceeds to step S505.

In step S505, the CPU 107 determines whether the battery 212 connected to the electronic device 200 is fully charged. In this step, the CPU 107 controls the NFC communication unit 105 so as to transmit the third command to the electronic device 200 via the power supply antenna 106. When response data corresponding to the third command is received from the electronic device 200, the CPU 107 uses the response data corresponding to the third command to determine whether the battery 212 is fully charged. If it is determined by the CPU 107 that the battery 212 is fully charged (YES in step S505), the process proceeds to step S506. If it is determined by the CPU 107 that the battery 212 is not fully charged (NO in step S505), the process proceeds to step S507.

In step S506, in the same manner as in step S411, the CPU 107 controls at least one of the oscillator 102, the power generation unit 103, and the matching circuit 104 so as not to output the first power and the second power via the power supply antenna 106. Then, the process performed in this flowchart is terminated.

In step S507, in the same manner as in step S408, the CPU 107 stops outputting the first power, and controls so as to output the second power via the power supply antenna 106. In this step, if it is determined that the time that has elapsed since the second power was output via the power supply antenna 106 is equal to or longer than a predetermined time T, the process proceeds to step S508.

In step S508, in the same manner as in step S409, the CPU 107 stops outputting the second power, and perform control so as to output the first power via the power supply antenna 106. Then, the process proceeds to step S509.

In step S509, in the same manner as in step S410, the CPU 107 determines whether the electronic device 200 has been removed from the predetermined range. If it is determined by the CPU 107 that the electronic device 200 has been removed from the predetermined range (YES in step S509), the process proceeds to step S506. If it is determined by the CPU 107 that the electronic device 200 has not been removed from the predetermined range (NO in step S509), the process returns to step S503.

In step S510, in the same manner as in step S416, the CPU 107 controls the NFC communication unit 105 so as to perform authentication for wireless communication based on the wireless LAN. Then, the process proceeds to step S511.

In step S511, in the same manner as in step S505, the CPU 107 determines whether the battery 212 connected to the electronic device 200 is fully charged. If it is determined by the CPU 107 that the battery 212 is fully charged (YES in step S511), the process proceeds to step S512. If it is determined by the CPU 107 that the battery 212 is not fully charged (NO in step S511), the process proceeds to step S514.

In step S512, in the same manner as in step S417, the CPU 107 controls the wireless communication unit 112 so as to perform wireless communication based on the wireless LAN standard. Then, the process proceeds to step S513.

In step S513, in the same manner as in step S418, the CPU 107 determines whether to finish the wireless communication based on the wireless LAN standard. If it is determined by the CPU 107 that the wireless communication based on the wireless LAN standard is to be finished (YES in step S513), the process proceeds to step S506. If it is not determined by the CPU 107 that the wireless communication based on the wireless LAN standard is to be finished (NO in step S513), the process in step S513 is repeated.

In step S514, in the same manner as in step S417, the CPU 107 controls the wireless communication unit 112 so as to perform wireless communication based on the wireless LAN standard. Then, the process proceeds to step S515.

In step S515, in the same manner as in step S408, the CPU 107 stops outputting the first power, and performs control so as to output the second power via the power supply antenna 106. The CPU 107 sets the value of the second power based on the remaining capacity of the battery 212 and the power for operating the wireless communication unit 218. In this step, if it is determined that the time that has elapsed since the second power was output via the power supply antenna 106 is equal to or longer than a predetermined time T, the process proceeds to step S516.

In step S516, the CPU 107 stops outputting the second power, and performs control so as to output the first power via the power supply antenna 106. Then, the process proceeds to step S517.

In step S517, in the same manner as in step S410, the CPU 107 determines whether the electronic device 200 has been removed from the predetermined range. If it is determined by the CPU 107 that the electronic device 200 has been removed from the predetermined range (YES in step S517), the process proceeds to step S506. If it is determined by the CPU 107 that the electronic device 200 has not been removed from the predetermined range (NO in step S517), the process proceeds to step S518.

In step S518, in the same manner as in step S418, the CPU 107 determines whether to finish the wireless communication based on the wireless LAN standard. If it is determined by the CPU 107 that the wireless communication based on the wireless LAN standard is to be finished (YES in step S518), the process returns to step S503. If it is not determined by the CPU 107 that the wireless communication based on the wireless LAN standard is to be finished (NO in step S518), the process returns to step S511.

If it is not determined by the CPU 107 that the wireless communication based on the wireless LAN standard is to be finished (NO in step S513), and if it is detected that the remaining capacity of the battery 212 is not equal to or greater than the predetermined value P, the CPU 107 terminates the process performed in the flowchart. Then, the CPU 107 may perform the process of steps S406 to 411 of the authentication process illustrated in FIG. 4 until the remaining capacity of the battery 212 is detected as being equal to or greater than the predetermined value P.

In step S514, the wireless communication based on the LAN wireless standard performed by the wireless communication unit 112 is continuously performed until it is determined to finish the wireless communication based on the LAN wireless standard.

Thus, the power supply apparatus 100 according to the first exemplary embodiment detects the state of the electronic device 200 based on close proximity wireless communication based on the NFC standard or the like. In this case, authentication for wireless communication based on the wireless LAN standard or the like is performed based on the state of power supply to the electronic device 200.

When the electronic device 200 is being supplied with power from a power supply apparatus other than the power supply apparatus 100, the power supply apparatus 100 performs close proximity wireless communication for wireless communication authentication even if the battery 212 of the electronic device 200 is not fully charged. Consequently, the power supply apparatus 100 can transmit data between the power supply apparatus 100 and the electronic device 200 preferentially over the supply of power to the electronic device 200. In this case, the power supply apparatus 100 control the power supply apparatus 100 and the electronic device 200 so as to be in the bidirectional communication mode. Consequently, the power supply apparatus 100 can control the electronic device 200 using a command, and the electronic device 200 can control the power supply apparatus 100 using a command.

Further, the power supply apparatus 100 is configured in such a manner that, when the electronic device 200 is being supplied with power from the power supply apparatus 100, the close proximity wireless communication for wireless communication authentication is performed after confirming that the battery 212 of the electronic device 200 can supply the power required for wireless communication to the electronic device 200. Consequently, the power supply apparatus 100 can transmit data between the power supply apparatus 100 and the electronic device 200 even before the battery 212 of the electronic device 200 is fully charged. In addition, in this case, the power supply apparatus 100 can perform the transmission of data between the power supply apparatus 100 and the electronic device 200 in parallel with the supply of power to the electronic device 200. Consequently, the electronic device 200 can use the power supplied from the power supply apparatus 100 to perform the transmission of data to the power supply apparatus 100. In addition, the electronic device 200 can use the power supplied from the power supply apparatus 100 to perform the reception of data from the power supply apparatus 100.

In addition, when the electronic device 200 is being supplied with power from the power supply apparatus 100, if the power required by the battery 212 of the electronic device 200 for performing wireless communication cannot be supplied to the electronic device 200, the power supply apparatus 100 preferentially supplies power to the electronic device 200.

Therefore, the power supply apparatus 100 can perform authentication for wireless communication based on the state of an electronic device.

When the electronic device 200 is being supplied with power from the power supply apparatus 100, the power supply apparatus 100 is set in the read/write mode, and the electronic device 200 is set in the card emulation mode. Consequently, the power supply apparatus 100 can perform close proximity wireless communication with the electronic device 200 while avoiding consuming much power that is stored in the battery 212 of the electronic device 200.

In the first exemplary embodiment, the power supply apparatus 100 and the electronic device 200 performed wireless communication based on the NFC standard. However, the power supply apparatus 100 and the electronic device 200 may perform close proximity wireless communication other than that based on the NFC standard, as long as such wireless communication can perform close proximity wireless communication. Instead of wireless communication based on the NFC standard, the power supply apparatus 100 and the electronic device 200 may perform close proximity wireless communication based on the FeliCa® standard. Further, instead of wireless communication based on the NFC standard, the power supply apparatus 100 and the electronic device 200 may perform close proximity wireless communication based on the radio-frequency identification (RFID) standard. In addition, instead of wireless communication based on the NFC standard, the power supply apparatus 100 and the electronic device 200 may perform close proximity wireless communication based on the MIFARE® standard (ISO/IEC 14443). Moreover, instead of wireless communication based on the NFC standard, the power supply apparatus 100 and the electronic device 200 may perform close proximity wireless communication based on the TransferJet® standard.

Further, in the first exemplary embodiment, to cause resonance to occur between the power supply apparatus 100 and the electronic device 200, the resonance frequency of the power supply antenna 106 and the resonance frequency of the power receiving antenna 201 are set at 13.56 MHz. However, the present invention is not limited to this. For example, if the power supply apparatus 100 and the electronic device 200 perform close proximity wireless communication based on the TransferJet standard instead of wireless communication based on the NFC standard, the resonance frequency of the power supply antenna 106 and the resonance frequency of the power receiving antenna 201 may be set at 4.48 GHz. In addition, if the power supply apparatus 100 performs wireless communication based on the Qi standard instead of the magnetic field resonance method, the resonance frequency of the power supply antenna 106 and the resonance frequency of the power receiving antenna 201 may be set at any frequency between 100 kHz and 250 kHz. Still further, the resonance frequency of the power supply antenna 106 and the resonance frequency of the power receiving antenna 201 may be set at 6.78 MHz, or a frequency of several hundred Hz or lower.

Moreover, the resonance frequency of the power supply antenna 106 and the resonance frequency of the power receiving antenna 201 during the period for transmitting the first power may be different from the resonance frequency of the power supply antenna 106 and the resonance frequency of the power receiving antenna 201 during the period for transmitting the second power.

Still further, in the first exemplary embodiment, the wireless communication unit 112 and the wireless communication unit 218 perform wireless communication based on the wireless LAN standard. However, it is not limited to this. For example, instead of wireless communication based on the wireless LAN standard, the wireless communication unit 112 and the wireless communication unit 218 may perform wireless communication based on the Bluetooth® standard. In this case, the first information and the second information include information relating to the Bluetooth standard.

Moreover, for example, instead of wireless communication based on the wireless LAN standard, the wireless communication unit 112 and the wireless communication unit 218 may perform wireless communication based on the Wireless HD® standard. In this case, the first information and the second information include information relating to the Wireless HD standard. Further, for example, instead of wireless communication based on the wireless LAN standard, the wireless communication unit 112 and the wireless communication unit 218 may perform wireless communication based on the wireless home digital interface (WHDI®) standard. In this case, the first information and the second information include information relating to the WHDI standard. For example, the power supply apparatus 100 may have a wired communication unit instead of the wireless communication unit 112, and the electronic device 200 may have a wired communication unit instead of the wireless communication unit 218. In this case, the wired communication unit in the power supply apparatus 100 and the wired communication unit in the electronic device 200 may perform communication based on the high-definition multimedia interface (HDMI®) standard. In this case, the first information and the second information include information relating to the HDMI standard. Further, the wired communication unit in the power supply apparatus 100 and the wired communication unit in the electronic device 200 may also perform communication based on the Display Port® standard. In this case, the first information and the second information include information relating to the Display Port standard.

Although the power supply apparatus 100 has the read/write mode and the bidirectional communication mode, the power supply apparatus 100 may also have the card emulation mode. Although the electronic device 200 has the card emulation mode and the bidirectional communication mode, the electronic device 200 may also have the read/write mode.

Embodiments of the present invention can also be realized by a computer of a system or apparatus that reads out and executes computer executable instructions recorded on a storage medium (e.g., computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-142178 filed Jun. 25, 2012, which is hereby incorporated by reference herein in its entirety.

What is claimed is:

1. A power supply apparatus comprising:
a power supply unit that wirelessly supplies power to an electronic device;
a first communication unit that communicates, based on a first communication method, with the electronic device to wirelessly supply power to the electronic device;
a second communication unit that communicates, based on a second communication method that is different from the first communication method, with the electronic device; and
a control unit that controls the first communication unit so as to acquire authentication data for a communication between the second communication unit and the electronic device if a remaining capacity of a battery, connected to the electronic device, is greater than or equal to a predetermined value,
wherein information relating to the remaining capacity of the battery connected to the electronic device is acquired from the electronic device via the first communication unit before acquiring the authentication data, and
wherein the control unit controls the first communication unit so as not to acquire the authentication data and controls the second communication unit so as not to communicate with the electronic device if the remaining capacity of the battery, connected to the electronic device, is less than the predetermined value.

2. The power supply apparatus according to claim 1, wherein the control unit controls the first communication unit not to acquire the authentication data from the electronic device until the remaining capacity of the battery exceeds the predetermined value if the remaining capacity of the battery is less than the predetermined value.

3. The power supply apparatus according to claim 1, wherein the control unit controls the second communication unit not to communicate with the electronic device until the remaining capacity of the battery exceeds the predetermined value, and controls the power supply unit so as to supply a predetermined power to be used for charging the battery to the electronic device until the remaining capacity of the battery exceeds the predetermined value.

4. The power supply apparatus according to claim 1, wherein the control unit controls the first communication unit so as to acquire the authentication data even if the remaining capacity of the battery is less than the predetermined value while the electronic device and an external power source apparatus are being connected.

5. The power supply apparatus according to claim 1, wherein the control unit controls the first communication unit so as to acquire the authentication data even if the remaining capacity of the battery is less than or equal to the predetermined value while the electronic device and a commercial power source are being connected.

6. The power supply apparatus according to claim 1, wherein the control unit controls the first communication unit so as to acquire the authentication data if the electronic device does not support a wireless power supply of the power supply apparatus.

7. The power supply apparatus according to claim 1, wherein the authentication data includes at least one of information indicating an address of the electronic device, information indicating a service set identifier (SSID) of the electronic device, information indicating an extended service set identifier (ESSID) of the electronic device, and information relating to encryption.

8. The power supply apparatus according to claim 1, wherein the control unit controls the second communication unit so as to receive data that the power supply apparatus does not acquire from the electronic device after the first communication unit acquires the authentication data from the electronic device.

9. The power supply apparatus according to claim 1, wherein the control unit controls the second communication unit so as to transmit data that the electronic device does not acquire from the power supply apparatus after the first communication unit acquires the authentication data from the electronic device.

10. The power supply apparatus according to claim 1, wherein the first communication method is a communication method based on a near field communication (NFC) standard.

11. The power supply apparatus according to claim 1, wherein the second communication method is a communication method based on either a wireless local area network standard or a Bluetooth standard.

12. A control method comprising:
communicating, based on a first communication method, with an electronic device to wirelessly supply power to the electronic device;
wirelessly supplying power to the electronic device; and
communicating, based on the first communication method, with the electronic device so as to acquire authentication data for communicating, based on a second communication method that is different from the first communication method, with the electronic device if a remaining capacity of a battery, connected to the electronic device, is greater than or equal to a predetermined value,
wherein information relating to the remaining capacity of the battery connected to the electronic device is acquired from the electronic device via the first communication method before acquiring the authentication data, and
wherein the authentication data is not acquired and the communication with the electronic device based on the second communication method is not established if the remaining capacity of the battery, connected to the electronic device, is less than the predetermined value.

13. A recording medium recording a program for causing a computer to execute a method, the method comprising:
communicating, based on a first communication method, with an electronic device to wirelessly supply power to the electronic device;
wirelessly supplying power to the electronic device; and
communicating, based on the first communication method, with the electronic device to acquire authentication data for communicating, based on a second communication method that is different from the first communication method, with the electronic device if a remaining capacity of a battery, connected to the electronic device, is greater than or equal to a predetermined value,
wherein information relating to the remaining capacity of the battery connected to the electronic device is acquired from the electronic device via the first communication method before acquiring the authentication data, and
wherein the authentication data is not acquired and the communication with the electronic device based on the second communication method is not established if the remaining capacity of the battery, connected to the electronic device, is less than the predetermined value.

* * * * *